June 24, 1930.  R. F. WARREN  1,767,630
PACK TREE AND HARNESS
Filed Dec. 28, 1927
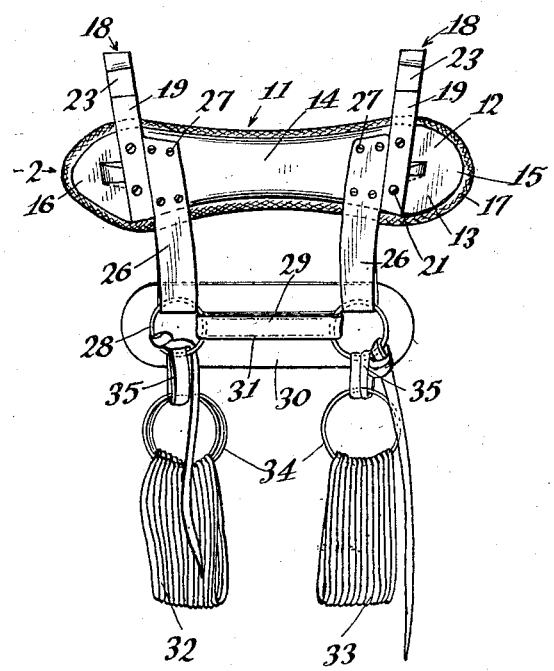
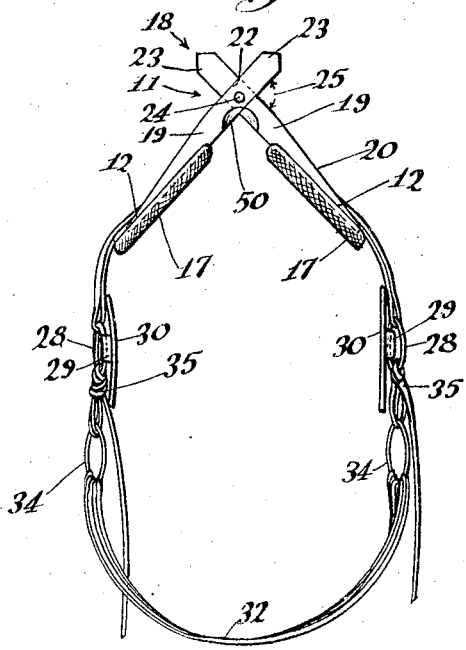
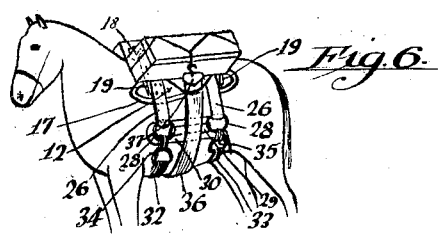
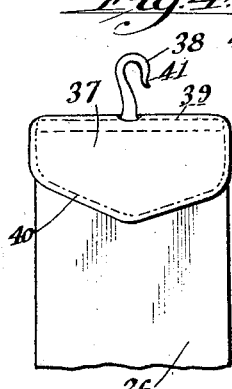
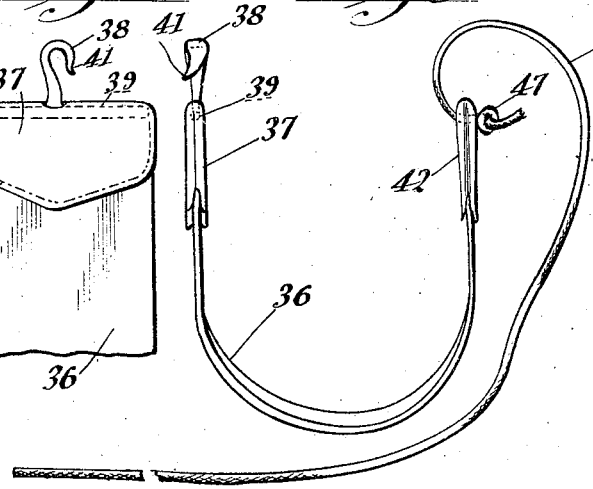
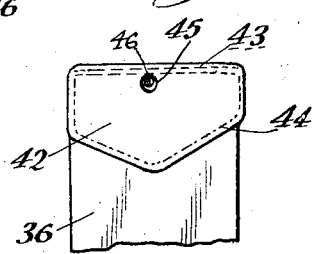
Inventor:
Roscoe F. Warren.
By Hazard and Miller
Attorneys Patented June 24, 1930

1,767,630

UNITED STATES PATENT OFFICE

ROSCOE F. WARREN, OF LOS ANGELES, CALIFORNIA

PACK TREE AND HARNESS

Application filed December 28, 1927. Serial No. 243,061.

My invention is a pack tree and harness for pack animals such as pack horses.

An object of my invention is the construction of a pack saddle and harness having a saddle with trees mounted thereon and with a harness which evenly distributes the load over a pack animal's back and provides leather side pieces fitting against the side of the pack animal to which the cinches are secured. With this pack saddle I utilize a a binding having a wide belly-band with a rope going under the animal's belly and completely over the pack load, thereby binding the load to the saddle and to the pack animal.

A more specific object of my invention is the construction of a saddle with saddle boards shaped to fit on the animal's back on each side of the back-bone, these having a configuration to fit the average pack animal, such as a pack horse. Connected to the pack saddle are front and rear trees formed by bars or slats which cross over each other preferably at an angle nearly a right angle and being securely bolted together and having an interfitting joint at the crossing of the bars.

A pair of supporting strips or loops formed of leather depend from each of the saddle boards, being attached thereto adjacent the trees and have rings attached thereto. These rings are connected by a linking strap, and to prevent rubbing against the side of the animal a strip of leather is attached to the linking strap, fitting between the animal and the rings. Cinches are then secured to the rings, preferably by tying straps.

The cross-over trees allow angular objects, such as boxes, to be readily placed against the trees and snugly bound against the crossover parts of the bars; then around the whole load and under the animal is passed a binding harness. This consists of a wide belly-band with a rope attached at one end. The opposite end of the belly-band has a hook to which the rope is secured, the rope passing over the top of the load on the pack saddle.

My invention will be more readily understood from the following description and drawings, in which:

Figure 1 is a side elevation of the pack saddle and part of the harness.

Fig. 2 is an end elevation, in the direction of the arrow 2 of Fig. 1.

Fig. 3 is a perspective view of the bellyband harness.

Fig. 4 is a side elevation of the hook end of the belly-band.

Fig. 5 is a view of the other end for attaching the rope.

Fig. 6 is a perspective view illustrating the manner of mounting the pack saddle and pack on the pack animal.

The saddle 11 is formed with a pair of boards 12, these being preferably wider adjacent the ends 13 and contracted in the center, as indicated at 14. The rear end of the saddle boards is preferably rounded as indicated at 15 and the front end somewhat pointed as indicated at 16. These boards are slightly warped to conform to the shape of the pack animal's back such as a pack horse, on opposite sides of the back-bone. Each of the boards has a padding 17 formed of sheep skin or other suitable material.

The trees 18 comprise a pair of bars 19 tapered at one end as indicated at 20 and secured by screws 21 to the saddle boards. These bars have rabbeted joints 22 forming a crossing so that the free ends 23 project beyond the joint. This joint is firmly secured by a bolt 24. The trees preferably cross so that the angle 25 is nearly a right angle.

A pair of supporting straps or loops 26 are attached to each of the saddle boards by screws 27 and fit adjacent the forward and rearward trees. These straps have rings 28 attached thereto, the rings being spaced apart by a link strap 29. This link strap is secured to a strip of leather 30 by stitching 31 or the like. There are two cinches, a forward cinch and a rear cinch, 32 and 33, each attached to rings 34 at the opposite ends. These cinches are preferably made of a series of cords. The rings 28 and 34 are secured by binding straps 35 which are looped several or more times through the two rings for each of the cinches, and then secured by a knot. In this manner the pack saddle may be comfortably positioned on the pack animal.

The binding harness comprises a belly-band or girth 36 preferably formed of three plies or more of canvas and has a leather end 37 at one end with a hook 38. This hook has a cross bar 39 fitted in the leather end 37, this end having stitching 40. The hook has a turned out point 41 which is designed to point outwardly from the pack animal and prevents annoyance to such animal as hereunder set forth.

The other end of the band or girth has a leather end or covering 42. This likewise has a cross bar 43 therein, the whole being secured by stitching 44. There is a perforation 45 through the end leather 42 and through this is passed a binding rope 46 secured by a knot 47.

The manner of fitting the pack saddle and harness is believed clear. However, it may be stated that the particular construction of the pack saddle with the cross-over trees allows rectangular articles, such as boxes 48 (Fig. 6), to be fitted against the cross bars 19 of the trees and two sides of the box to fit against the upper and lower parts of opposite bars, fitting approximately in the angle 25. More or less loose material 49 may be placed on top of the boxes or the articles secured on the side of the pack, and the whole load is bound to the pack animal by the belly-band or girth and rope, in the manner shown in Fig. 6. In this binding, on account of the hook 41 having the end extending outwardly from the animal, the rope is easily looped under such hook and the hook does not dig into the side of the animal when carrying the pack.

It will thus be seen that I have developed a simple type of pack saddle and harness which is of comparatively light weight and yet sufficiently strong to support a heavy load, and also to pack articles, boxes, etc. which are of an inconvenient shape to mount on pack animals.

A feature of my pack saddle is that both the forward and rearward trees have their outer surfaces in the same planes. This allows such articles as boxes to be fitted snugly against the bars 19 and against the upper part of such bars, and this construction prevents rocking of the boxes, so that there is always a snug load on the pack animal which does not shift with every movement. I prefer to secure the load on the pack animal by what is known as the "diamond hitch", as illustrated in Fig. 6, as this securely binds the load on the pack saddle, and, at the same time secures the load by means of the girth, to the pack animal. The front trees are slightly cut away at the top, as indicated by the numeral 50, so that the pack animal may raise its neck without the forward trees bearing against the back of the neck.

Various changes may be made in the principles of my invention without departing from the spirit thereof, as set forth in the description, drawings and claims.

I claim:

1. In the art described, a pack saddle having a pair of saddle boards extending longitudinally and at an angle to each other, a plurality of trees formed of bars secured to the saddle boards and each tree having a pair of bars secured to each other, a pair of supporting straps connecting to each of the saddle boards, a ring attached to each strap, cinches connected to opposite rings, and a flexible spacing link strap between each of the rings on each side of a pack animal.

2. In the art described, a pack saddle having a pair of saddle boards extending longitudinally and at an angle to each other, a plurality of trees formed of bars secured to the saddle boards and each tree having a pair of bars secured to each other, a pair of supporting straps connecting to each of the saddle boards, a ring attached to each strap, cinches connected to opposite rings, a flexible spacing link strap between each of the rings on each side of a pack animal, and a protecting strip of sheet material secured between each pair of rings on the side of a pack animal between such rings and the animal.

3. In the art described, a pack saddle having a pair of saddle boards extending in a longitudinal direction and at an angle to each other, a pair of trees each formed of a pair of bars, the bars of each pair being secured to the saddle boards and crossing over each other, said bars being secured together at the cross-over, a pair of supporting straps connected to each saddle board adjacent each of the trees, a ring secured to each of the straps, a flexible link strap connecting each ring on the same side of the saddle, a protecting strip secured to each of the links and fitting behind the said rings, a pair of cinches having rings, and means to secure the rings of the cinches and the rings on the supporting straps.

4. In the art described, a binding for a pack saddle comprising a belly-band or girth having leather strips secured to opposite ends, one of said strips having a cross bar therein with a hook attached thereto, the hook having an outturned point and the other strip having a cross bar and an aperture through the leather with a rope through said aperture.

In testimony whereof I have signed my name to this specification.

ROSCOE F. WARREN.